Nov. 28, 1961  A. LESLIE  3,010,315
WEATHER VANES
Filed Jan. 22, 1960

INVENTOR
Albert Leslie
BY
Herbert S. Fairbanks
ATTORNEY

United States Patent Office 3,010,315
Patented Nov. 28, 1961

3,010,315
WEATHER VANES
Albert Leslie, Bon-Accord Farm, Shanesville, Pa.
Filed Jan. 22, 1960, Ser. No. 4,031
2 Claims. (Cl. 73—188)

The object of this invention is to devise a novel weather vane which will serve to indicate the direction of the wind but also act as an animated display device.

A further object is to devise a novel weather vane having a stationary support on which a flat turntable is free to revolve due to the presence of a vertically disposed wind vane, the support carrying a stationary gear which is intergeared with a crankshaft to which spring arms of an animated figure are connected so that a pivoted portion of the figure will bob up and down during the rotation of the turntable; and the stationary support is provided with compass points in proximity to the path of travel of the wind vane.

With the foregoing and other objects in view as will hereinafter clearly appear, my invention comprehends a novel weather vane.

It further comprehends a novel turntable having a movable portion of a figure mounted on the turntable driven by a stationary gear on the support, the turntable having a wind driven vane, and a stationary support on which the turntable is mounted having compass points.

For the purpose of illustrating the invention, I have shown in the accompanying drawings a preferred embodiment of it which I have found in practice to give satisfactory and reliable results. It is, however, to be understood that the various instrumentalities of which the invention consists can be variously arranged and organized, and the invention is not limited, except by the scope of the appended claims, to the exact arrangement and organization of these instrumentalities as herein set forth.

Similar numerals of reference indicate corresponding parts.

Figure 1:
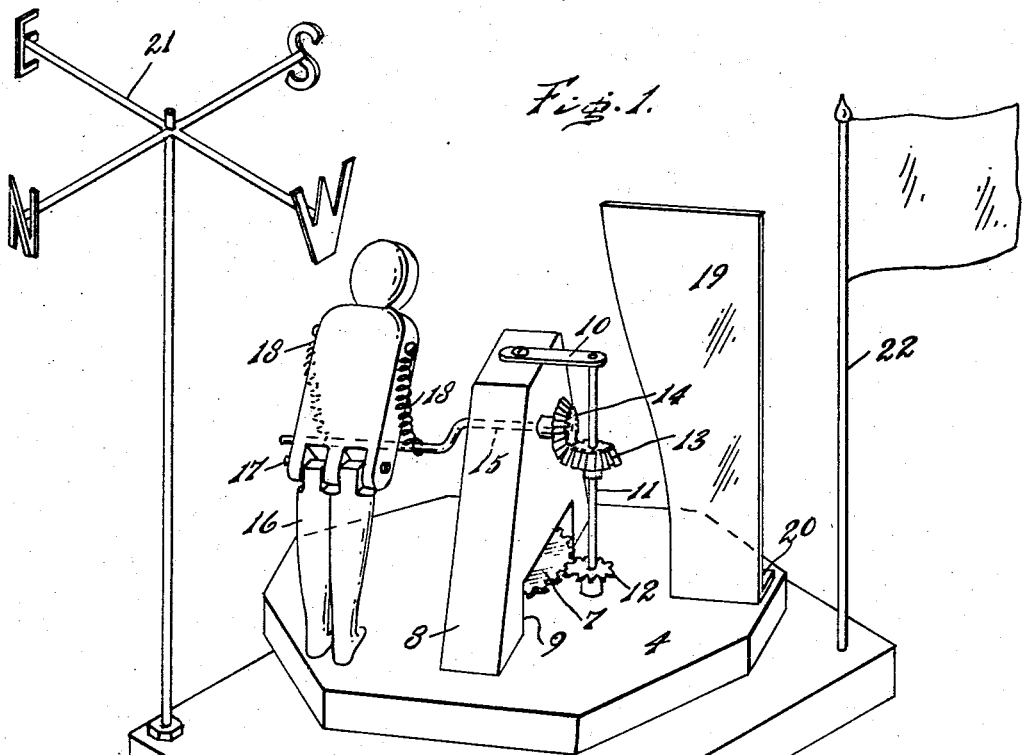
FIGURE 1 is a perspective view of a weather vane embodying my invention.
Figure 2:
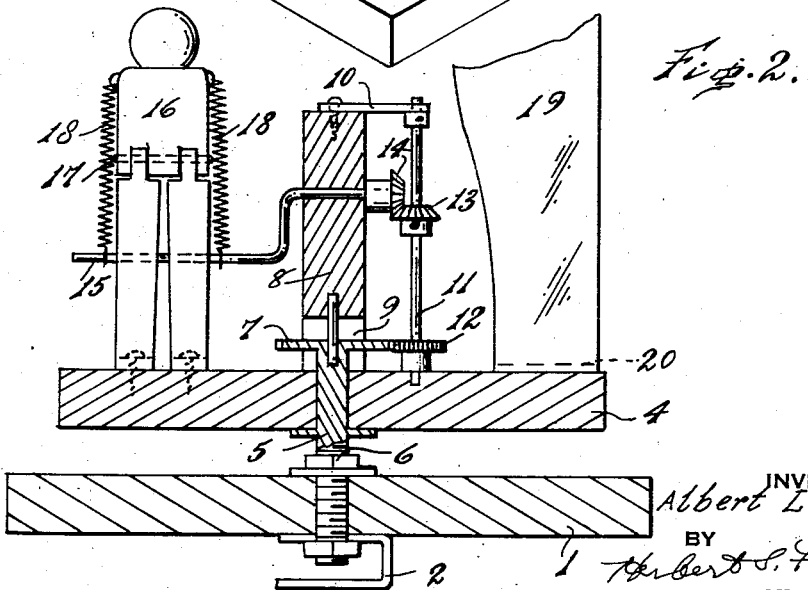
FIGURE 2 is a sectional elevation of a portion of FIGURE 1.

Referring to the drawings:

The weather vane has a stationary support 1 designed to be connected with a stationary object, and for purpose of illustration has been shown as having a bottom bracket 2 with a downwardly extending rod or pipe 3. A bearing rod on which a turntable 4 is free to revolve has a threaded portion to receive nuts 6 to fasten it to the support 1 and to support the bracket 3. The rod 5 serves not only as a mounting for the turntable but also supports a stationary gear 7 positioned within an upstanding block 8 fixed to the turntable and provided with a cutout 9 so that the gear will be at the center of the turntable. A bracket 10 carried by the block 8 serves as a mounting for a shaft 11 the lower end of which extends into the turntable. A lower gear 12 on the shaft 11 meshes with the stationary gear 7, and an upper gear 13 on the shaft 11 meshes with a gear 14 on a crankshaft 15 journalled in the block 8.

A figure 16 mounted on the turntable has its upper portion pivoted at 17 and arms 18 on the upper portion of the figure are in the form of springs connected with the crankshaft.

A wind vane 19 is radially disposed on the turntable and has a flange 20 at its bottom fixed to the turntable.

A compass points assembly 21 has a rod fixed to the stationary support 1 and the compass points are in proximity to the path of travel of the wind vane. A flag 22 may also be mounted on the stationary support.

It will be apparent from the foregoing description that the pressure of the wind against the wind vane will cause the turning of the turntable and the movement of the movable portion of the figure.

Having thus described the invention, what I claim as new and desire to secure by Letters Patent is:

1. A weather vane, comprising a stationary support, a bearing rod fixed to said support, a turntable free to revolve on said bearing rod, a stationary gear fixed to said bearing rod, a block mounted on the top face of the turntable, a crankshaft journalled in said block, a shaft intergeared with said stationary gear and with said crankshaft, a figure mounted on the turntable and having a movable portion with arms connected with said crankshaft, a wind vane vertically and radially disposed on said turntable and with its lower end fixed on the turntable, and compass points carried by said stationary support in proximity to the travel of said wind vane.

2. The construction defined in claim 1, wherein said arms are in the form of coil springs.

References Cited in the file of this patent
UNITED STATES PATENTS

| | | |
|---|---|---|
| 1,213,714 | Washburne et al. | Jan. 23, 1917 |
| 1,260,833 | Thatcher | Mar. 26, 1918 |
| 1,461,179 | Crenshaw et al. | July 10, 1923 |
| 1,502,599 | Timmons | July 22, 1924 |